REMOTE SOUND SYSTEM MONITOR CIRCUIT

Filed Oct. 16, 1962

INVENTOR.
EDWARD S. SEELEY
BY Samuel Lindenberg
ATTORNEY

United States Patent Office 3,161,731
Patented Dec. 15, 1964

3,161,731
REMOTE SOUND SYSTEM MONITOR CIRCUIT
Edward S. Seeley, Santa Ana, Calif., assignor to The Altec Lansing Corporation, Anaheim, Calif., a corporation of Delaware
Filed Oct. 16, 1962, Ser. No. 230,882
6 Claims. (Cl. 179—175.1)

This invention relates to a circuit for monitoring the condition of remotely located sound systems and more particularly to improvements therein.

When elements of a sound system are placed at a location which is remote from the point of control or point of origin of the program to be carried by this sound system, the problem arises as to whether or not the remote system is functioning satisfactorily. For example: a community wide disaster warning and instruction system may consist of a manned control center and a number of remote unmanned amplifier-speaker systems connected by telephone lines to the control center. Heretofore the practice has been to carry out periodic tests of such systems with observers stationed as necessary to report performance and, in addition, to make frequent inspections and measurements of the electronic portions of such remote subsystems to discover deterioration or malfunction. Such a procedure, besides being costly, is also disturbing to the public, and can lead to making the tests infrequently and inadequately in order to minimize the public disturbance.

An object of the present invention is the provision of a system for determining from the control center the capability of remotely located sound equipment to function normally.

Another object of the present invention is the provision of a system for monitoring the operation of a remotely located sound system which operates with a minimum disturbance to the public.

Yet another object of the present invention is the provision of a monitoring system for a remotely located sound system which operates with a minimum of actual operation of the remotely located equipment.

Still another object of the present invention is the provision of a monitoring system for a remotely located sound system which operates at substantially no cost.

These and other objects of the invention are achieved in an arrangement whereby specific sensing circuits are disposed at the remotely located system which it is desired to monitor. These sensing circuits when operated, provide a signal which is returned to the control center over the same lines over which audio signals for the remotely located systems are transmitted. The return signals uniquely indicate the operating condition of the remotely located system whereby, if needed, corrective action can be taken.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 2:
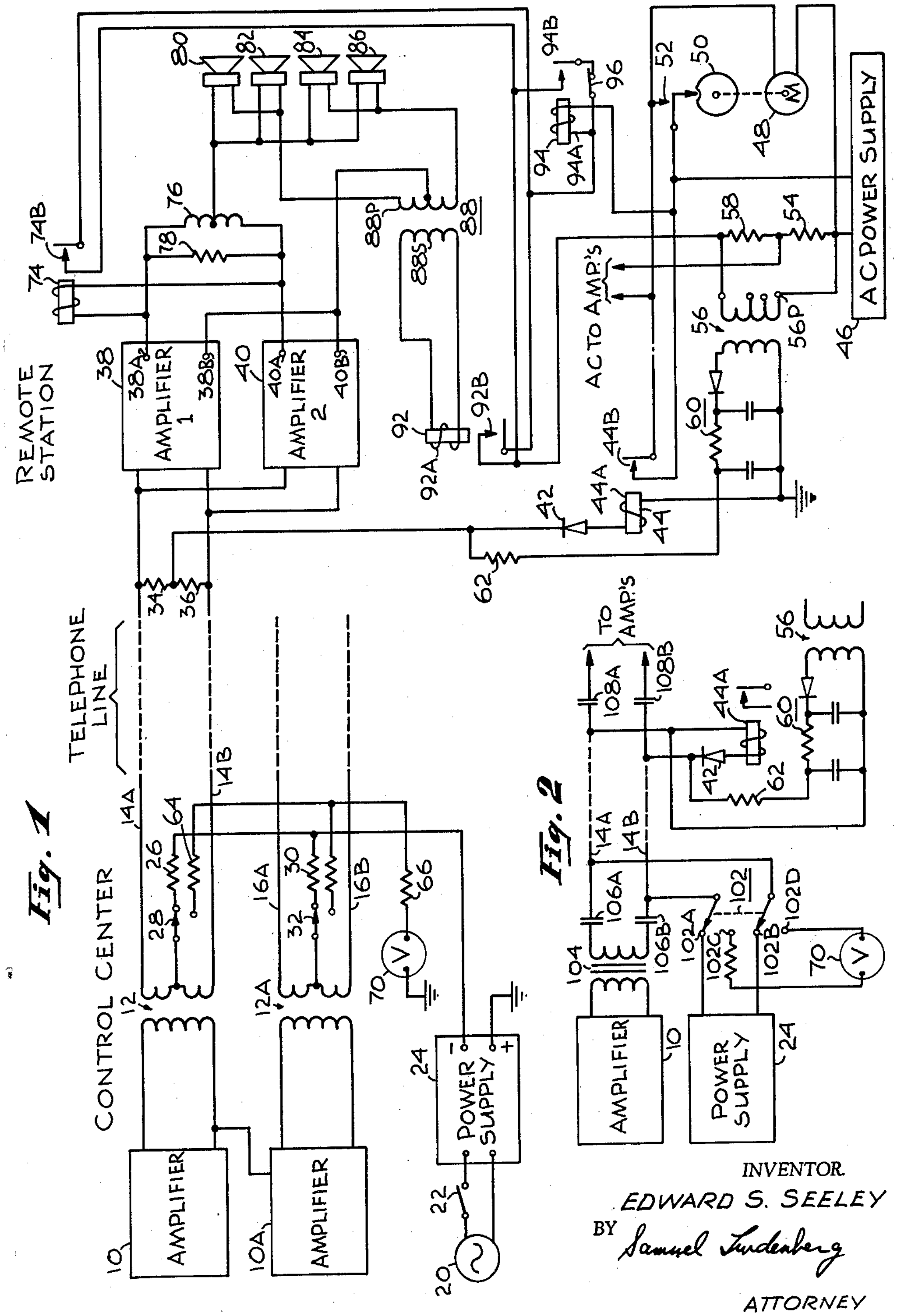
FIGURE 1 is a circuit diagram of the embodiment of the invention.
FIGURE 2 is a circuit diagram of a modification of the embodiment of the invention.

In order to explain the invention, the description herein will be based on a sound system having a control center at one location and one or more remotely located unmanned subsystems consisting essentially of two to four amplifiers and a plurality of speakers connected to the message center by a single telephone pair for each such subsystem. Thus FIGURE 1 is a circuit diagram showing a subsystem connected to the control center by a single telephone pair. As indicated this should not be taken as a limitation upon the invention since, as will become more clear herein, the concepts of this invention may be employed with a plurality of subsystems.

Referring now to FIGURE 1, amplifiers 10 and 10A respectively, are employed for driving different remotely located sound systems. The output of amplifier 10 is connected to a transformer 12 having a center tapped secondary winding. The transformer 12 is connected to a telephone pair respectively 14A, 14B which are used to bring both power control signals and audio signals to the remotely located sound system and to return monitoring signals to the control center. Amplifier 10A just as amplifier 10, is connected to a transformer 12A having a center tapped secondary winding. Transformer 12A has its secondary winding connected to a telephone pair 16A, 16B which serve the same function as has been described for telephone pair 14A, 14B.

The remote amplifiers are turned on, when required, by means of turn-on signals from a commercial power source 20, which is located at the control center. The output of the power source is applied through a turn-on switch 22 to a power supply 24. The power supply 24 provides a direct voltage for actuating control equipment at the remote location which causes the application of alternating current power to the remotely located amplifiers.

Amplifier 10 applies audio signals through the transformer 12 to the telephone pair 14A, 14B. Power supply 24 has its positive terminal grounded and the negative terminal is connected through a resistor 26 and a switch 28, to the center tap of the secondary winding of the transformer 12. Similarly, a connection for turn-on voltage is made to the secondary winding of transformer 12A through a resistor 30 and a switch 32. From henceforth this description will concern itself with a single remote station since connections to more than one remote station in accordance with this invention will be apparent from this description.

It is required to determine from the message center first whether the telephone pair has developed a fault, second, whether the amplifiers have failed to turn on due to power failure or other cause, third, whether the amplifiers are performing in a sub-normal manner or fourth, whether a speaker has developed a defective voice coil. This invention shows how all these may be achieved at minimal cost.

At the remote location two identical resistors respectively 34, 36 are connected across the telephone pair. Two amplifiers respectively 38, 40 are connected parallel to the incoming telephone pair 14A, 14B. The amplifiers will include the requisite circuits for separating the transmitted turn on potential from the audio signal. The remote subsystem is turned on by closing switch 22 which results in direct current from the power supply 24, flowing through switch 28 which is set to the normal operating position, over both sides of the telephone line to the remotely located amplifier through resistors 34, 36, through a rectifier 42, a relay winding 44A of a relay 44 to ground. The winding 44A of the relay 44 is energized by the turn on voltage and the relay contacts 44B are thereby closed whereby power is applied from a power supply 46 to a motor 48. When the motor 48 is energized it commences to rotate and drives a cam 50. The power supply 46 may be the commercial alternating current power supply at the remote location.

When the cam commences to rotate it closes a cam-operated switch 52. The cam-operated switch now maintains power from the power supply 46 applied to the motor 48 even though relay 44 may become de-energized. The motor continues to rotate the cam 50 over a predetermined interval which depends upon the motor speed.

After one complete rotation of the cam, switch 52 opens and the motor will stop unless the relay 44 is still energized.

The power supply 46 is connected to the amplifiers 38, 40 to supply the required operating power thereto over a path which includes cam operated switch 52 when closed or relay contact 44B when closed. Also included in the path to the amplifiers is a resistor 54 having one end connected both to the power supply 46 and to one side of a primary winding 56P of a transformer 56. The other end of the resistor 54 is connected to the amplifiers and also to one end of a resistor 58. The other end of the resistor 58 is connected to the other end of the transformer winding 56P. In accordance with the foregoing description it will be seen that the amplifiers 38, 40 when the cam operated switch 52 is closed, receive power through the resistors. A small voltage drop occurs across these resistors which is stepped up by the transformer 56 and applied to a rectifying and filtering network 60 to be converted to a direct current voltage. One side of the rectifying circuit 60 is connected to ground. The other side of the rectifying circuit 60 is connected through a resistor 62 to the junction between resistors 34, 36.

Once the turn-on voltage for the amplifiers has been applied over the telephone pair 14A, 14B, it is no longer necessary to keep switch 28 closed since the motor 48 and the cam 50 will maintain the operating potential applied to the amplifiers. Accordingly, switch 28 may be operated to its other position. In this position switch 28 connects the center tap of the secondary winding of transformer 12 to a resistor 64. The resistor 64 is connected in series with another resistor 66 to an indicator such as a volt meter 70. The voltage detected at the transformer 56 indicative of the power being supplied to the amplifiers 38, 40, may thus be measured at the control center by means of the volt meter 70. The amplitude of this voltage indicates whether or not both amplifiers are drawing normal line power since it is very simple to standardize the voltage indicated by the volt meter to represent the proper condition of operation of amplifiers at the remote location. The magnitude of this voltage may be standardized for any telephone line length by proper selection of the resistor 64. This resistor will usually have a different value for each line connected to the control center. Thus, when a standard voltage is indicated, assurance is given that the entire turn-on procedure took place correctly and both amplifiers are drawing their normal line current.

The two amplifiers respectively 38 and 40 are coupled together into a common load in a manner which is shown, described and claimed in Patent #3,051,788 for an amplifier inter-connecting circuit. Amplifier 38 has output terminals respectively 38A, 38B. Amplifier 40 has output terminals respectively 40A, 40B. In accordance with the invention described in the Patent No. 3,051,788, terminals 38B and 40B are connected together. An unbalance sensing relay 74, has its relay winding connected to terminals 38A and 40A. The center tapped winding 76 and a resistor 78 are also connected between output terminals 38A and 40A. Although not essential to the present invention, it may be observed that if this resistor has a resistance value four times that of the load which comprises four loud speakers, respectively 80, 82, 84, 86, then, as described in the aforesaid patent, in the event of the failure of one or the other of the amplifiers, the load which the remaining amplifier will see is the same as when both amplifiers are alike and normal.

One connection for one terminal of each one of the loud speakers 80, 82, 84, 86, is made to the center tap of winding 76. Terminals 38B and 40B of the amplifiers 38, 40, respectively are connected to the center tap of the primary winding 88P of a transformer 88. One end of the primary winding 88P is connected to the other terminal of loud speakers 80, 82. The other end of primary winding 88P is connected to the other terminal of loud speakers 84, 86. Thus, effectively the four loud speakers have one of their terminals connected in parallel. Two of the terminals of two of the loud speakers are connected in parallel with one another and two of the terminals of the remaining two loud speakers are connected in parallel with one another.

The secondary winding 88S of the transformer 88 is connected to the winding 92A of a sensitive relay 92.

The contacts 74B of relay 74 and the contacts 92B of relay 92 are connected in parallel. The winding 94A of a relay 94 has one side connected directly to the alternating current power supply 46 and the other side connected through the parallel connected contacts 74B, 92B to one end of the resistor 58. Accordingly, should either one of the relays 74 or 92 be energized, relay 94 is energized. The contacts of 94B of relay 94 are connected in self-latching fashion to the winding 94 through a normally closed switch 96. Accordingly, when the relay 94 is operated it is held operated despite the turn off of power to the relays 92 and 74 by reason of the cam 50 attaining a position at which the switch contacts 52 are open. The switch 96 is opened when it is desired to reset the relay 94 to its normally inoperative position.

It should be noted that the relays 74 and 92 are sensitive relays which can be operated by speech currents of small magnitude. When amplifiers 38 and 40 are operating normally and in-phase, then there is no voltage difference between terminals 38A and 40A and relay 74 remains unoperated. Should the gains of the two amplifiers differ, as happens with deterioration or failure of one of them, the sensitive relay 74 is made to operate from the unbalance of the output speech currents, which in turn causes relay 94 to be operated. The current to the relay coil 94 flows through the resistors 54 and 58 and is maintained even though current for the amplifiers is turned off by reason of the cam operated switch 52 being opened. The current drawn by the relay 94 through the resistors 54, 58, provides a voltage which adds to the voltage generated by the operating power current of the amplifiers passing through resistor 54, thus substantially increasing the voltage which is transmitted back to the control center. The measuring meter at the control center can indicate the greater voltage transmitted back, which will be interpreted as an indication of trouble with an amplifier.

When the voice coils of all the speakers 80, 82, 84, 86, have the same resistance, equal currents flow through the primary winding 88P from opposite ends to the mid-tap thus producing no voltage across the secondary winding. If one voice coil sustains a short circuit, an open circuit, or other impedance anomaly, the balance of currents in the center tap primary is lost and a voltage is produced across the secondary winding 86S, which causes operation of the sensitive relay 92. When sensitive relay 92 is operated it causes the operation of relay 94 which locks up over its contact pair 94B. Thus relay 94 may be caused to operate by the operation of relay 74 on relay 92, due either to an unbalance between amplifiers 38 and 40 or to unbalance between pairs of loud speakers 80, 82 and 84, 86 respectively. As already pointed out, operation of relay 94 causes the transmission of a larger voltage back to the control center which will be indicated by voltmeter 70, thus revealing a defect at the remote location due to either deterioration of the amplifying capability of either amplifier, or due to an abnormality, such as a burn-out or short circuit, in a loud speaker voice coil. The locked up condition can be easily determined after the system has turned off as previously described. Alternatively, the locked up condition may be observed immediately after the signal application by the fact that the direct voltage found at the control center on the simplex circuit is greater than the value standardized for the power current for two amplifiers.

To prevent the return voltage on the telephone pair from operating relay 44 and holding it operated after a lockup of the relay 94, the return voltage is given a polarity opposite to that used to operate the relay 44. The diode 42 serves the function of blocking out this return voltage whereby the excitation of the relay is limited only to a voltage having the polarity indicated for turning on the amplifiers.

The arrangement described in accordance with this invention makes it possible to carry out easily and inexpensively checks to establish the operating readiness of amplifiers and loud speakers at a remote point and also of the telephone lines supplying signals to the remote equipment.

In the foregoing description the turn-on signal and the monitor signal are described as being transmitted by the ground-simplex circuit. This choice is not required for either signal as they may be transmitted over a loop consisting of the two conductors of the line pair only. There may be reasons why the monitor signals in this case must be prevented from feeding back into the amplifier input. So long as the fed-back signals are outside the frequency spectrum of the desired intelligence signals separation can be accomplished readily with filters.

FIGURE 2 illustrates an arrangement whereby when the fed-back signals are all of the D.C. type, separation of the fed-back and of the forward turn-on signals from the audio signals may be easily accomplished. Thus, in the circuit shown in FIGURE 2 similar functioning apparatus will be given the same reference numerals. The power supply 24 is connected to two terminals respectively 102A, 102B of a double-pole double-throw switch 102. The meter 70 is connected to the other two terminals respectively 102C, 102D of the double-pole double-throw switch. The double-pole double-throw switch is connected to the telephone pair 14A, 14B. Amplifier 10 is connected through a transformer 104, which does not necessarily have a center tap secondary winding. The secondary winding of the transformer 104 is connected through capacitors 106A, 106B to the telephone pair 14A, 14B.

The other ends of the telephone pair 14A, 14B are connected to the amplifier through the respective capacitors 108A, 108B. On the line side of these capacitors a connection is made to both the relay 44 and to the rectifier and filter circuit 60.

The capacitors 106A, 106B and 108A, 108B block the turn-on current from entering the amplifier inputs and the fed-back voltages from effecting either the transformer 104 or the amplifiers. After the turn-on signal has been transmitted over double-pole double-throw switch 102, which is shown in the position for transmitting the turn-on signal, the double-pole double-throw switch may be moved to its second position whereupon it connects terminals 102C and 102D to the telephone line 14A and 14B. In this position the meter 70 can indicate, by the voltages which are applied thereto, the operating conditions at the remote location of the sound equipment.

There has been accordingly described herein a novel, useful and simple circuit arrangement for monitoring at a control center the conditions occurring at one or more remotely located sound systems. The arrangement described performs this monitoring with a minimum of cost of equipment, with a minimum of drain on the equipment and with a minimum of operation of the equipment.

I claim:

1. A system for indicating at a control location the operating condition of equipment including amplifier means and loud speaker means in circuit therewith, said amplifier means receiving audio signals from said control location over a telephone pair comprising a source of operating potential at said remote location, impedance means connecting said source of operating potential to said amplifier means, a relay having a relay coil, means operated responsive to a defect occurring in the circuit of said amplifier means, and said loud speaker means for connecting said relay coil to said source of operating potential through said impedance to cause said relay to become operative, means for detecting a voltage across said impedance means, means for transmitting said voltage to said control location over said telephone pair, and means connected to said telephone pair at said control location for indicating said detected voltage whereby the operating condition of said equipment may be determined.

2. A system for indicating at a control location the operating condition of equipment including a pair of amplifiers located at a remote location to which signals are transmitted over a pair of conductors from said control location, comprising a source of operating power at said remote location, means actuated from said control location over said pair of conductors for applying power from said source of operating power to said pair of amplifiers, said means including a resistor connected in the current flow path between said source of power and said pair of amplifiers, means for detecting a voltage across said resistor, means for applying said detected voltage to said pair of conductors, and means at said control location connected to said pair of conductors for indicating said detected voltage whereby irregularities in the amplifiers indicated by the power requirement may be detected at said control location.

3. A system for indicating at a control location the operative condition of equipment located at a remote location, said equipment including a first and second amplifier having their inputs connected to receive signals over a pair of conductors extending from said control location, and having their outputs connected to a feed a common load, said indicating system comprising a source of operating potential at said remote location, means including a resistor connecting said source of operating potential to said amplifiers, a relay having a relay coil, means for detecting an unbalance in the output of said two amplifiers to said common load, means operated responsive to operation of said means for detecting for connecting said relay coil to said source of operating potential through said resistor, a transformer having a primary and secondary windings, means coupling said transformer winding across said resistor, means coupling said transformer secondary winding to said pair of conductors, an indicator at said control location, and means for connecting said indicator to said pair of conductors for indicating the operating condition of said two amplifiers.

4. A system as recited in claim 3 wherein said common load comprises a plurality of loud speakers, means for detecting a defect in the operation of said loud speakers, means responsive to said means for detecting a defect in the operation of said loud speakers for connecting said relay coil to said source of operating power through said resistor whereby said indicator at said control location may also indicate the operative condition of said loud speakers.

5. A system for indicating at a control location the operating condition of equipment including a first and second amplifier each having a first and second output terminal and a plurality of loud speakers which are coupled thereto, each of said loud speakers having a first and second input terminal, said system comprising means for applying signals to said amplifiers from said control location over a pair of conductors, means for connecting said first and second amplifiers to drive said plurality of loud speakers as a common load comprising means connecting a first one of the input terminals of each one of said loud speakers to one of the output terminals of said two amplifiers, a transformer having a center tap primary winding and a secondary winding, means connecting the second input terminal of two of said plurality of loud speakers to one end of said primary winding, means connecting the second input terminal of two of the other ones of said plurality of loud speakers to the other end of said primary winding, means connecting the second output terminal of said two amplifiers to said center tap of said primary winding, a relay having a relay coil, a resistor, a source of operating potential, means responsive to the appearance of a voltage across the secondary winding of said transformer, for connecting said relay coil to said source of operating potential through said resistor, means for detecting a voltage across said resistor, means for applying said detected voltage to said pair of conductors, means at said control location for indicating a voltage, and means for connecting said means for indicating to said pair of conductors for indicating the operating condition of said plurality of loud speakers.

6. A system for indicating at a control location the operating condition of equipment including a first and second amplifier each having first and second output terminals and at least four loud speakers each having first and second input terminals, said amplifiers receiving audio signals from said control location over a pair of conductors, said system comprising a source of operating potential at said remote location, resistance means, means for connecting said source of operating potential to said first and second amplifiers through said resistance means, means for connecting the first output terminal of each of said amplifiers to all of the first input terminals of all of said loud speakers, a first transformer having a center tapped primary winding and a secondary winding, means connecting said second output terminals of said amplifiers to said primary winding center tap, means connecting two of the second input terminals of two of said loud speakers to one end of said primary winding, means connecting the second input terminals of the remaining two of said loud speakers to the other end of said primary winding, a relay having a relay coil, means connected between the first output terminal of each one of said amplifiers for detecting the presence of an unbalance therebetween, means responsive to said means for detecting an unbalance to connect said relay coil to said source of operating potential through said resistive means, means responsive to a voltage appearing across said transformer secondary winding to connect said relay coil to said source of operating potential through said resistive means, a second transformer having a primary and secondary winding, means connecting said primary winding of said second transformer across said resistive means, means connecting said secondary winding of said second transformer to said second pair of conductors, an indicator at said control location, means for connecting said indicator to said pair of conductors for indicating the voltage appearing thereacross whereby the operating condition of said first and second amplifiers and said plurality of loud speakers may be determined.

References Cited by the Examiner

UNITED STATES PATENTS

| | | | |
|---|---|---|---|
| 1,974,087 | 9/34 | Stocker | 179—27 |
| 3,021,397 | 2/62 | Barnett et al. | 179—175.31 |

ROBERT H. ROSE, *Primary Examiner.*